US008679685B2

United States Patent
Jeon et al.

(10) Patent No.: US 8,679,685 B2
(45) Date of Patent: Mar. 25, 2014

(54) LITHIUM SECONDARY BATTERY INCLUDING DINITRILE COMPOUND

(75) Inventors: Jong-Ho Jeon, Daejeon (KR);
Doo-Kyung Yang, Daejeon (KR);
Sung-Hoon Yu, Daejeon (KR);
Min-Hyung Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/447,883

(22) Filed: Apr. 16, 2012

(65) Prior Publication Data

US 2012/0202124 A1 Aug. 9, 2012

Related U.S. Application Data

(63) Continuation of application No. PCT/KR2011/009236, filed on Nov. 30, 2011.

(30) Foreign Application Priority Data

Nov. 30, 2010 (KR) .................. 10-2010-0120713
Nov. 30, 2011 (KR) .................. 10-2011-0127156

(51) Int. Cl.
*H01M 6/04* (2006.01)
*H01M 6/16* (2006.01)
*H01M 6/00* (2006.01)

(52) U.S. Cl.
USPC ................... 429/339; 429/188; 429/324

(58) Field of Classification Search
USPC ........................................... 429/339
See application file for complete search history.

(56) References Cited

U.S. PATENT DOCUMENTS

2008/0020287 A1 * 1/2008 Cho et al. ............... 429/339
2010/0143799 A1 * 6/2010 Park ....................... 429/219

* cited by examiner

*Primary Examiner* — Barbara Gilliam
*Assistant Examiner* — Steven Scully
(74) *Attorney, Agent, or Firm* — Birch, Stewart, Kolasch & Birch, LLP

(57) ABSTRACT

Disclosed is a lithium secondary battery. The lithium secondary battery includes a cathode, an anode, a separator and a non-aqueous electrolyte solution. Either the cathode or the anode or both include metal oxide coating layers on electrode active material particles forming the electrode or a metal oxide coating layer on the surface of an electrode layer formed on a current collector. The non-aqueous electrolyte solution contains an ionizable lithium salt, an organic solvent, and a dinitrile compound having a specific structure. In the lithium secondary battery, degradation of the electrode is prevented and side reactions of the electrolyte solution are inhibited. Therefore, the lithium secondary battery exhibits excellent cycle life and output performance characteristics.

10 Claims, No Drawings

LITHIUM SECONDARY BATTERY INCLUDING DINITRILE COMPOUND

CROSS-REFERENCE TO RELATED APPLICATION

This application is a continuation of International Application PCT/KR2011/009236 filed on Nov. 30, 2011, which claims priority to Korean Patent Application Nos. 10-2010-0120713 and 10-2011-0127156 filed in the Republic of Korea on Nov. 30, 2010 and Nov. 30, 2011, respectively, the entire contents of which are incorporated herein by reference.

TECHNICAL FIELD

The present disclosure relates to a lithium secondary battery, and more particularly to a lithium secondary battery with excellent cycle characteristics and output characteristics.

BACKGROUND ART

In recent years, there has been increasing interest in energy storage technologies. As the application fields of energy storage technologies have been extended to mobile phones, camcorders, notebook computers and even electric cars, there has been a growing demand for high energy-density batteries as power sources for such electronic devices. In response to this demand, research on lithium secondary batteries is being actively undertaken.

Many companies have produced a variety of lithium secondary batteries with different safety characteristics. It is very important to evaluate and ensure safety of such lithium secondary batteries. The most important consideration for safety is that operational failure or malfunction of lithium secondary batteries should not cause injury to users. For this purpose, safety regulations strictly restrict the possibilities of dangers (such as fire and smoke) of lithium secondary batteries.

Lithium-containing metal oxides and carbon materials are usually used at present as cathode and anode active materials of lithium secondary batteries, respectively. However, a lithium secondary battery fabricated using the electrode active materials suffers from safety problems, for example: overcharge/overdischarge resulting from malfunction of a protective device; internal short circuits caused by an external impact or defects of a separator; exothermic reactions between a charged cathode and an electrolyte solution under abnormal conditions, such as during high-temperature storage, to cause decomposition of the cathode; heat emission arising from short circuits between the cathode and an anode; and decomposition reactions of the electrolyte solution at the electrode interface.

In an effort to solve the above safety problems caused by electrode active materials, a technique has been proposed in which a metal oxide is coated on the surface of at least one electrode layer or the surfaces of electrode active material particles. This metal oxide coating is known to be effective in inhibiting a change in the volume of the electrode active material during charge and discharge and in blocking an electrolyte solution from being in direct contact with the electrode active material to prevent side reactions of the electrolyte solution.

On the other hand, as the charge/discharge cycles of a battery proceed, metal ions (typically transition metal ions) other than lithium are also dissolved from a lithium-containing metal oxide as a cathode active material. A metal oxide coating layer can inhibit dissolution of the metal ions to some extent but cannot completely block the electrode active material. Further, passages through which lithium ions pass are present in the metal oxide coating layer. Therefore, dissolution of the metal ions is unavoidable. The dissolved metal ions cause decomposition reactions of an electrolyte solution.

Along with the recent increasing demand for high-capacity lithium secondary batteries, high voltages are required as conditions for battery operation. However, high-voltage operating conditions primarily increase side reactions of electrolyte solutions and also induce rapid dissolution of metal ions from lithium metal oxides as cathode active materials. The dissolved metal ions further promote side reactions of electrolyte solutions.

DISCLOSURE

Technical Problem

The present disclosure is designed to solve the problems of the prior art, and therefore it is an object of the present disclosure to provide a lithium secondary battery in which side reactions of an electrolyte solution can be inhibited despite the use of at least one electrode including a metal oxide coating layer to achieve excellent cycle characteristics and output characteristics.

It is another object of the present disclosure to provide a lithium secondary battery that has good ability to inhibit side reactions of an electrolyte solution, particularly under high voltage operating conditions, achieving excellent cycle characteristics and output characteristics even under high voltage conditions.

Technical Solution

In order to achieve the above objects, there is provided a lithium secondary battery including a cathode, an anode, a separator and a non-aqueous electrolyte solution, wherein either the cathode or the anode or both include metal oxide coating layers on electrode active material particles forming the electrode or a metal oxide coating layer on the surface of an electrode layer formed on a current collector, and the non-aqueous electrolyte solution contains an ionizable lithium salt, an organic solvent and a dinitrile compound represented by Formula 1:

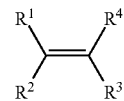

(1)

wherein one of $R^1$ and $R^2$ and one of $R^3$ and $R^4$ are —R—CN (wherein each R is independently $C_1$-$C_{12}$ alkylene, $C_1$-$C_{12}$ haloalkylene, $C_2$-$C_{12}$ alkenylene, $C_2$-$C_{12}$ alkynylene, $C_7$-$C_{18}$ benzylene, $C_7$-$C_{18}$ halobenzylene, $C_6$-$C_{18}$ arylene or $C_6$-$C_{18}$ haloarylene), and the remainders of $R^1$, $R^2$, $R^3$ and $R^4$ are independently hydrogen, $C_1$-$C_{12}$ alkyl, $C_1$-$C_{12}$ haloalkyl, $C_1$-$C_{12}$ alkoxy, $C_2$-$C_{12}$ alkenyl, $C_3$-$C_{18}$ aryl, $C_3$-$C_{18}$ haloaryl, $C_7$-$C_{18}$ benzyl, $C_7$-$C_{18}$ halobenzyl or halogen.

More specific examples of dinitrile compounds suitable for use in the non-aqueous electrolyte solution include, but are not limited to, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene and 1,6-dicyano-2-methyl-5-methyl-3-hexene. These dinitrile compounds may be used alone or as a mixture of two or more thereof. The nitrile groups of the dinitrile compound may be in cis or trans positions around the double bond. Preferably, the nitrile groups are in trans positions.

The dinitrile compound may be included in an amount of 0.1 to 10 parts by weight, based on 100 parts by weight of the lithium salt and the organic solvent. 0.1 to 5 parts by weight is preferred and 0.1 to 2 parts by weight is more preferred.

The lithium salt and the organic solvent of the non-aqueous electrolyte solution may be those known in the art. For example, the organic solvent may be an ether, an ester, an amide, a linear carbonate, a cyclic carbonate or a mixture thereof. Preferably, the organic solvent is a propionate ester represented by Formula 2:

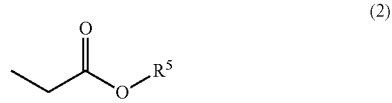

(2)

wherein $R^5$ is a $C_1$-$C_5$ alkyl group.

In the cathode and/or the anode, the metal oxide may be a oxide of a metal selected from the group consisting of Mg, Al, Co, K, Na, Ca, Si, Ti, Zr, Sn, Y, Sr, Mo, Mn, and V, or mixtures thereof.

Advantageous Effects

In the lithium secondary battery of the present disclosure, degradation of an electrode active material and side reactions of the electrolyte solution can be prevented due to the formation of a metal oxide coating layer on the electrode to achieve improved cycle life and output performance.

In addition, in the lithium secondary battery of the present disclosure, acceleration of side reactions of the electrolyte solution caused by metal ions dissolved from a cathode active material when operated under high voltage condition can be effectively inhibited. Therefore, the lithium secondary battery of the present disclosure can exhibit excellent cycle life and output performance characteristics even when operated under high voltage conditions.

MODE FOR DISCLOSURE

Hereinafter, preferred embodiments of the present disclosure will be described in detail with reference to the accompanying drawing. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As explained above, the formation of a metal coating layer in an electrode can inhibit a change in the volume of an electrode active material to prevent degradation of the electrode and can block direct contact between an electrolyte solution and the electrode active material to partially suppress side reactions of the electrolyte solution.

However, the metal coating layer cannot completely block dissolution of metal ions, particularly transition metal ions, from a cathode active material, which causes the occurrence of side reactions of the electrolyte solution.

Particularly, the present inventors have found that a metal oxide present in a metal oxide coating layer provides a site where side reactions of an electrolyte solution occur, and accelerates the side reactions. Specifically, as the charge/discharge cycles of a battery proceed, transition metal ions are dissolved from a lithium transition metal oxide as a cathode active material and the exposed metal oxide of the metal oxide coating layer introduced into the electrode provides a site where the transition metal is deposited from the transition metal ions. The deposited transition metal acts as a catalyst to accelerate side reactions of an electrolyte solution. Therefore, the introduction of the metal oxide coating layer is determined to considerably increase the side reactions of the electrolyte solution. Particularly, larger amounts of the transition metal ions are dissolved when the battery is operated under high voltage conditions. This brings about an increase in the amount of the transition metal deposited on the metal oxide to considerably accelerate the side reactions of the electrolyte solution.

In order to solve the above problems, the present disclosure provides a lithium secondary battery including a cathode, an anode, a separator and a non-aqueous electrolyte solution, wherein either the cathode or the anode or both include metal oxide coating layers on electrode active material particles forming the electrode or a metal oxide coating layer on the surface of an electrode layer formed on a current collector, and the non-aqueous electrolyte solution contains an ionizable lithium salt, an organic solvent and a dinitrile compound represented by Formula 1:

(1)

wherein one of $R^1$ and $R^2$ and one of $R^3$ and $R^4$ are —R—CN (wherein each R is independently $C_1$-$C_{12}$ alkylene, $C_1$-$C_{12}$ haloalkylene, $C_2$-$C_{12}$ alkenylene, $C_2$-$C_{12}$ alkynylene, $C_7$-$C_{18}$ benzylene, $C_7$-$C_{18}$ halobenzylene, $C_6$-$C_{18}$ arylene or $C_6$-$C_{18}$ haloarylene), and the remainders of $R^1$, $R^2$, $R^3$ and $R^4$ are independently hydrogen, $C_1$-$C_{12}$ alkyl, $C_1$-$C_{12}$ haloalkyl, $C_1$-$C_{12}$ alkoxy, $C_2$-$C_{12}$ alkenyl, $C_3$-$C_{18}$ aryl, $C_3$-$C_{18}$ haloaryl, $C_7$-$C_{18}$ benzyl, $C_7$-$C_{18}$ halobenzyl or halogen.

The nitrile groups at both ends of the dinitrile compound are bonded to transition metal ions dissolved from the cathode to prevent the transition metal ions from being deposited on the surfaces of the metal oxide on the electrode. The bonding between the dinitrile compound and the transition metal leads to the formation of a bulkier metallic compound. The increased volume of the metallic compound impedes its mobility in the electrolyte solution, which also becomes a cause of inhibiting side reactions of the electrolyte solution caused by the transition metal. Furthermore, the presence of the unsaturated double bond in the dinitrile compound further increases the bonding strength between the terminal nitrile groups and the transition metal, thus being very effective in capturing the transition metal and preventing the transition metal from separating.

Particularly, the dinitrile compound has good ability to capture the transition metal even under high voltage conditions to effectively prevent side reactions of the electrolyte solution. That is, the use of the dinitrile compound not only ensures safety of the battery but also is very useful in improving the cycle performance and output performance of the battery.

Exemplary examples of dinitrile compounds suitable for use in the non-aqueous electrolyte solution include, but are not limited to, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene and 1,6-dicyano-2-methyl-5-methyl-3-hexene. These dinitrile compounds may be used alone or as a mixture of two or more thereof.

The nitrile groups of the dinitrile compound may be in cis or trans positions around the double bond. Preferably, the nitrile groups are in trans positions.

The dinitrile compound may be included in an amount of 0.1 to 10 parts by weight, based on 100 parts by weight of the lithium salt and the organic solvent. 0.1 to 5 parts by weight is preferred and 0.1 to 2 parts by weight is more preferred. If the content of the dinitrile compound is less than 0.1 parts by weight, the ability of the dinitrile compound to capture transition metal ions may deteriorate. Meanwhile, if the content of the dinitrile compound exceeds 10 parts by weight, the viscosity of the electrolyte solution may increase excessively.

The lithium salt and the organic solvent of the non-aqueous electrolyte solution may be those commonly used in the art.

Examples of anions of lithium salts suitable for use in the non-aqueous electrolyte solution include, but are not limited to, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_4CF_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Non-limiting examples of organic solvents suitable for use in the non-aqueous electrolyte solution include, but are not limited to, ether, ester, amide, linear carbonate and cyclic carbonate. These organic solvents may be used alone or as a mixture of two or more thereof.

The non-aqueous electrolyte solution may include a carbonate compound, such as a cyclic carbonate, a linear carbonate or a mixture thereof, as a representative example of the organic solvent. Specifically, the cyclic carbonate compound may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, halides thereof, and mixtures thereof. The linear carbonate compound may be selected from the group consisting of, but not limited to, dimethyl carbonate (DMC), diethyl carbonate (DEC), dipropyl carbonate, ethyl methyl carbonate (EMC), methyl propyl carbonate, ethyl propyl carbonate, and mixtures thereof.

Ethylene carbonate and propylene carbonate, which are highly viscous and high dielectric constants cyclic carbonates, are particularly preferred because of their good ability to dissociate the lithium salt present in the electrolyte solution. A mixture of such a cyclic carbonate and a linear carbonate whose viscosity and dielectric constant are low, such as dimethyl carbonate or diethyl carbonate, in a suitable ratio is more preferably used because it can be used to prepare an electrolyte solution having a high electrical conductivity.

Examples of the ether include, but are not limited to, dimethyl ether, diethyl ether, dipropyl ether, methyl ethyl ether, methyl propyl ether and ethyl propyl ether. These ethers may be used alone or as a mixture of two or more thereof.

Examples of the ester include, but are not limited to, methyl acetate, ethyl acetate, propyl acetate, methyl propionate, ethyl propionate, γ-butyrolactone, γ-valerolactone, γ-caprolactone, σ-valerolactone and ∈-caprolactone. These esters may be used alone or as a mixture of two or more thereof. Preferred is a propionate represented by Formula 2:

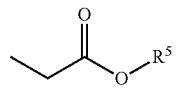

(2)

wherein $R^5$ is a $C_1$-$C_5$ alkyl group.

The propionate of Formula 2 may be advantageous when used under high-voltage operating conditions.

Specifically, as the propionate of Formula 2, there can be exemplified methyl propionate, ethyl propionate or propyl propionate.

The non-aqueous electrolyte solution for the lithium secondary battery of the present disclosure may further include at least one additive for the formation of a solid electrolyte interface (SEI) layer. The additive may be any of those known in the art so long as it does not detract from the objects of the present disclosure. The additive may be selected from the group consisting of, but not limited to, cyclic sulfites, saturated sultones, unsaturated sultones, acyclic sulfones, and mixtures thereof. One of the cyclic carbonates described above, for example, vinylene carbonate and vinyl ethylene carbonate, may also be used as the additive for the formation of an SEI layer to improve the life characteristics of the battery.

As the cyclic sulfites, there may be exemplified ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite. As the saturated sultones, there may be exemplified 1,3-propane sultone and 1,4-butane sultone. As the unsaturated sultones, there may be exemplified ethene sultone, 1,3-propene sultone, 1,4-butene sultone and 1-methyl-1,3-propene sultone. As the acyclic sultones, there may be exemplified divinyl sulfone, dimethyl sulfone, diethyl sulfone, methyl ethyl sulfone and methyl vinyl sulfone.

The content of the additive for the formation of a SEI layer used may suitably vary depending on the specific kind of the additive. For example, the additive may be included in an amount of 0.01 to 10 parts by weight, based on 100 parts by weight of the lithium salt and the organic solvent.

The non-aqueous electrolyte solution may be used without further processing as a liquid electrolyte for the lithium secondary battery. Alternatively, the non-aqueous electrolyte solution may be impregnated into a polymer to prepare a gel polymer electrolyte before use in the lithium secondary battery.

The lithium secondary battery of the present disclosure can be fabricated by injecting the non-aqueous electrolyte solution into an electrode structure consisting of the cathode, the anode and the separator interposed between the two electrodes.

The cathode and the anode may be those commonly used to fabricate lithium secondary batteries.

Preferably, the lithium secondary battery of the present disclosure uses a lithium-containing transition metal oxide as a cathode active material. Examples of such lithium-containing transition metal oxides include $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0<y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$). These lithium-containing transition metal oxides may be used alone or as a mixture of two or more thereof. Lithium-containing transition metal sulfides, selenides and halides may also be used.

A mixture of $Li_xCoO_2$ ($0.5<x<1.3$) and $Li_x(Ni_aCo_bMn_c)O_2$ ($0.5<x<1.3$, $0<a<1$, $0<b<1$, $0<c<1$, $a+b+c=1$) is preferably used as the cathode active material. $Li_x(Ni_aCo_bMn_c)O_2$ ($0.5<x<1.3$, $0<a<1$, $0<b<1$, $0<c<1$, $a+b+c=1$) is particularly preferred in that it can exhibit high output characteristics under high voltage conditions.

As an active material of the anode, there can be used a carbon material, lithium metal, silicon or tin capable of intercalating/de intercalating lithium ions. A metal oxide whose potential for lithium is less than 2 V, such as $TiO_2$ or $SnO_2$, may also be used as the anode active material. The use of a carbon material is preferred. The carbon material may be one having low crystallinity or high crystallinity. Representative examples of suitable low-crystallinity carbon materials include soft carbon and hard carbon. Examples of suitable high-crystallinity carbon materials include natural graphite, Kish graphite, pyrolytic carbon, mesophase pitch based carbon fiber, meso-carbon microbeads, mesophase pitches, and high-temperature sintered carbon materials, such as petroleum or coal tar pitch derived cokes.

The cathode and/or the anode may include a binding agent. The binding agent may be selected from various kinds of binder polymers, such as vinylidene fluoride-hexafluoropropylene copolymers (PVDF-co-HFP), polyvinylidene fluoride, polyacrylonitrile and polymethyl methacrylate.

The cathode and/or the anode includes metal oxide coating layers on the surfaces of the individual electrode active material particles. Alternatively, the cathode and/or the anode includes a metal oxide coating layer on the surface of an electrode layer formed by applying an electrode slurry on a current collector.

The metal oxide is not particularly limited in the present disclosure and may be any of those used to coat electrode layers or electrode active materials in the art. For example, the metal oxide may be a oxide of a metal selected from the group consisting of, but not limited to, Mg, Al, Co, K, Na, Ca, Si, Ti, Zr, Sn, Y, Sr, Mo, Mn, and V, or mixtures thereof.

The metal oxide can be coated by general methods known in the art, including: chemical methods, such as solvent evaporation, co-precipitation, precipitation, sol-gel coating, filtration after adsorption, sputtering and CVD; and coating methods under mechanical stress, such as mechano-fusion. After coating, annealing may also optionally be conducted to make the metal oxide amorphous.

That is, the metal oxide in the coating layer(s) may be in a particle or amorphous phase depending on the coating method of the metal oxide.

The separator may be a porous polymer film commonly used in the art. Examples of materials for the porous polymer film include polyolefin polymers, such as ethylene homopolymers, propylene homopolymers, ethylene/butane copolymers, ethylene/hexane copolymers and ethylene/methacrylate copolymers. The separator may be a laminate of two or more porous polymer films. The separator may be a porous non-woven fabric. Examples of materials for the porous non-woven fabric include, but are not limited to, high melting-point glass fiber and polyethylene terephthalate fiber.

The lithium secondary battery of the present disclosure can be fabricated by injecting the non-aqueous electrolyte solution into an electrode structure consisting of the cathode, the anode and the separator interposed between the two electrodes.

There is no particular restriction on the shape of the lithium secondary battery of the present disclosure. For example, the lithium secondary battery of the present disclosure may be cylindrical or prismatic depending on the shape of a can it employs. Alternatively, the lithium secondary battery of the present disclosure may be of pouch or coin type.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Preparation of Non-Aqueous Electrolyte Solution

Ethylene carbonate (EC), fluoroethylene carbonate (FEC) and dimethyl carbonate (DMC) as organic solvents were mixed in a volume ratio of 2:1:7, and $LiPF_6$ as a lithium salt was dissolved therein until the concentration reached 1 M. To 100 parts by weight of the solution were added 0.5 parts by weight of 1,4-dicyano-2-butene, 2 parts by weight of vinylene carbonate (VC) and 3 parts by weight of 1,3-propane sultone (PS) to prepare a non-aqueous electrolyte solution.

Fabrication of Secondary Battery

A cathode active material containing $LiCoO_2$ coated with Al was applied to an aluminum current collector, and a cathode tab was attached to one end of the current collector so as to protrude upward to produce a cathode. An anode active material containing artificial graphite was applied to a copper current collector, and an anode tab was attached to one end of the current collector so as to protrude upward to produce an anode.

Thereafter, in accordance with a known general procedure, a separator was interposed between the cathode and the anode to construct an electrode assembly, and the non-aqueous electrolyte solution was injected into the electrode assembly to fabricate a lithium secondary battery.

Example 2

Preparation of Non-Aqueous Electrolyte Solution

Ethylene carbonate (EC), fluoroethylene carbonate (FEC) and methyl propionate (MP) as organic solvents were mixed in a volume ratio of 2:1:7, and $LiPF_6$ as a lithium salt was dissolved therein until the concentration reached 1 M. To 100 parts by weight of the solution were added 0.5 parts by weight of 1,4-dicyano-2-butene, 2 parts by weight of vinylene carbonate (VC) and 3 parts by weight of 1,3-propane sultone (PS) to prepare a non-aqueous electrolyte solution.

Fabrication of Secondary Battery

A cathode active material containing $LiCoO_2$ coated with Al was applied to an aluminum current collector, and a cathode tab was attached to one end of the current collector so as to protrude upward to produce a cathode. An anode active material containing artificial graphite was applied to a copper current collector, and an anode tab was attached to one end of the current collector so as to protrude upward to produce an anode.

Thereafter, in accordance with a known general procedure, a separator was interposed between the cathode and the anode to construct an electrode assembly, and the non-aqueous electrolyte solution was injected into the electrode assembly to fabricate a lithium secondary battery.

Example 3

A non-aqueous electrolyte solution was prepared and a lithium secondary battery was fabricated in the same manner as in Example 2, except that 1,4-dicyano-2-butene was used in an amount of 1.0 part by weight.

Example 4

A non-aqueous electrolyte solution was prepared and a lithium secondary battery was fabricated in the same manner as in Example 2, except that 1,4-dicyano-2-butene was used in an amount of 3.0 parts by weight.

Comparative Example 1

A non-aqueous electrolyte solution was prepared and a lithium secondary battery was fabricated in the same manner as in Example 2, except that 1,4-dicyano-2-butene was not used.

Comparative Example 2

A non-aqueous electrolyte solution was prepared and a lithium secondary battery was fabricated in the same manner as in Example 2, except that 2 parts by weight of succinonitrile was used instead of 0.5 parts by weight of 1,4-dicyano-2-butene.

Evaluation of Initial Efficiencies

The lithium secondary batteries fabricated in Examples 1-4 and Comparative Examples 1-2 were aged for 2 days. Thereafter, each of the lithium secondary batteries was charged at a constant current of 600 mA at 23° C. until the voltage reached 4.35 V, and thereafter, the lithium secondary battery was charged at a constant voltage of 4.35 V. Charging was stopped when the charged current reached 150 mA. Then, the lithium secondary battery was allowed to stand for 10 min and was discharged at a constant current of 600 mA until the voltage reached 3.0 V. The charge and discharge cycles were repeated twice.

The rate (%) of the discharge capacity of the battery after the first cycle relative to the charge capacity of the battery after the first cycle was defined as initial efficiency. The results are shown in Table 1.

Evaluation of High-Temperature Cycle Capacity Retentions

After completion of the initial efficiency evaluation, each of the lithium secondary batteries fabricated in Examples 1-4 and Comparative Examples 1-2 was charged at a constant current of 2,100 mA at 55° C. until the voltage reached 4.35 V, and thereafter, the lithium secondary battery was charged at a constant voltage of 4.35 V. Charging was stopped when the charged current reached 150 mA. Then, the lithium secondary battery was allowed to stand for 10 min and was discharged at a constant current of 1,500 mA until the voltage reached 3.0 V. The charge and discharge cycles were repeated 300 times. The rate (%) of the discharge capacity of the battery after 300 cycles relative to the discharge capacity of the battery after the first cycle was defined as high-temperature cycle capacity retention (%). The results are shown in Table 1.

TABLE 1

|  | Initial efficiency (%) | High-temperature cycle capacity retention (%) |
|---|---|---|
| Example 1 | 91 | 72 |
| Example 2 | 92 | 76 |
| Example 3 | 91 | 84 |
| Example 4 | 91 | 83 |
| Comparative Example 1 | 92 | 7 |
| Comparative Example 2 | 91 | 34 |

As can be seen from the results in Table 1, the lithium secondary batteries of Examples 1-4, each of which includes the non-aqueous electrolyte solution containing the dinitrile compound with a carbon-carbon double bond, had initial efficiencies similar to the lithium secondary batteries of Comparative Examples 1 and 2 but showed markedly improved high-temperature cycle capacity retentions compared to the lithium secondary batteries of Comparative Examples 1 and 2.

What is claimed is:

1. A lithium secondary battery comprising a cathode, an anode, a separator and a non-aqueous electrolyte solution, wherein either the cathode or the anode or both include metal oxide coating layers on electrode active material particles forming the electrode or a metal oxide coating layer on the surface of an electrode layer formed on a current collector, and the non-aqueous electrolyte solution comprises an ionizable lithium salt, an organic solvent and a dinitrile compound represented by Formula 1, wherein the dinitrile compound is present in an amount of 0.1 to 10 parts by weight, based on 100 parts by weight of the lithium salt and the organic solvent, and wherein the dinitrile compound is bonded to transition metal ions dissolved from the cathode to prevent the transition metal ions from being deposited on the surfaces of the metal oxide on the electrode:

(1)

wherein one of $R^1$ and $R^2$ and one of $R^3$ and $R^4$ are —R—CN, wherein each R is independently $C_1$-$C_{12}$ alkylene, $C_1$-$C_{12}$ haloalkylene, $C_2$-$C_{12}$ alkenylene, $C_2$-$C_{12}$ alkynylene, $C_{1-7}$-$C_{18}$ benzylene, $C_7$-$C_{18}$ halobenzylene, $C_6$-$C_{18}$ arylene or $C_6$-$C_{18}$ haloarylene, and the remainders of $R^1$, $R^2$, $R^3$ and $R^4$ are independently hydrogen, $C_1$-$C_{12}$ alkyl, $C_1$-$C_{12}$ haloalkyl, $C_1$-$C_{12}$ alkoxy, $C_2$-$C_{12}$ alkenyl, $C_3$-$C_{18}$ aryl, $C_3$-$C_{18}$ haloaryl, $C_7$-$C_{18}$ benzyl, $C_7$-$C_{18}$ halobenzyl or halogen.

2. The lithium secondary battery according to claim 1, wherein the dinitrile compound is selected from the group consisting of 1,4-dicyano-2-butene, 1,4-dicyano-2-methyl-2- butene, 1,4-dicyano-2-ethyl-2-butene, 1,4-dicyano-2,3-dimethyl-2-butene, 1,4-dicyano-2,3-di ethyl-2-butene, 1,6-dicyano-3-hex ene, 1,6-dicyano-2-methyl-3-hexene, 1,6-dicyano-2-methyl-5-methyl-3-hexene, and mixtures thereof.

3. The lithium secondary battery according to claim 1, wherein the nitrile groups of the dinitrile compound are in trans positions.

4. The lithium secondary battery according to claim 1, wherein the anion of the lithium salt is selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6$, $BF_2C_2O_4^-$, $BC_4O_8^-$, $(CF_3)_2PF_4^-$, $(CF_3)_3PF_3^-$ $(CF_3)_4PF_2^-$, $(CF_3)_5PF^-$, $(CF_3)_6P^-$, $CF_3SO_3^-$, $CF_4CF_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2$, $CH_3CO_2^-$, $SCN^-$, and $(CF_3CF_2SO_2)_2N^-$.

5. The lithium secondary battery according to claim 1, wherein the organic solvent is selected from the group consisting of ether, ester, amide, linear carbonate, cyclic carbonate, and mixtures thereof.

6. The lithium secondary battery according to claim 5, wherein the ester is a propionate ester represented by Formula 2:

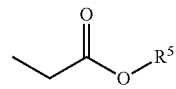

(2)

wherein $R^5$ is a $C_1$-$C_5$ alkyl group.

7. The lithium secondary battery according to claim 1, wherein the metal oxide is a oxide of a metal selected from the group consisting of Mg, Al, Co, K, Na, Ca, Si, Ti, Zr, Sn, Y, Sr, Mo, Mn, and V, or mixtures thereof.

8. The lithium secondary battery according to claim 1, wherein the metal oxide in the coating layer is in a particle or amorphous phase.

9. The lithium secondary battery according to claim 1, wherein the dinitrile compound is present in an amount of 0.1 to 5 parts by weight, based on 100 parts by weight of the lithium salt and the organic solvent.

10. The lithium secondary battery according to claim 1, wherein the dinitrile compound is present in an amount of 0.1 to 2 parts by weight, based on 100 parts by weight of the lithium salt and the organic solvent.

* * * * *